United States Patent
Hung et al.

(10) Patent No.: US 9,625,315 B2
(45) Date of Patent: Apr. 18, 2017

(54) OPTICAL SENSING MODULE, OPTICAL MECHANISM OF SPECTROMETER, AND SPECTROMETER

(71) Applicant: OTO PHOTONICS INC.

(72) Inventors: Chien-Hsiang Hung, Hsinchu (TW); Jan Liang Yeh, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 74 days.

(21) Appl. No.: 14/764,924

(22) PCT Filed: Jan. 30, 2013

(86) PCT No.: PCT/CN2013/071115
§ 371 (c)(1),
(2) Date: Jul. 30, 2015

(87) PCT Pub. No.: WO2014/117331
PCT Pub. Date: Aug. 7, 2014

(65) Prior Publication Data
US 2015/0369662 A1    Dec. 24, 2015

(51) Int. Cl.
*G01J 3/28* (2006.01)
*G01J 3/02* (2006.01)
*G01J 3/18* (2006.01)

(52) U.S. Cl.
CPC ........... *G01J 3/0218* (2013.01); *G01J 3/0208* (2013.01); *G01J 3/0262* (2013.01); *G01J 3/18* (2013.01); *G01J 3/2803* (2013.01)

(58) Field of Classification Search
CPC .............. G01J 3/02; G01J 3/18; G01J 3/28
See application file for complete search history.

(56) References Cited

U.S. PATENT DOCUMENTS

| 5,153,668 A | 10/1992 | Katzir et al. |
| 2009/0207387 A1* | 8/2009 | Eyal .................... G02B 6/4204 355/1 |

FOREIGN PATENT DOCUMENTS

| TW | 200846638 A | 12/2008 |
| TW | 201131138 A | 9/2011 |
| TW | 201144791 A | 12/2011 |
| TW | 201213792 A | 4/2012 |
| TW | 201235658 A | 9/2012 |

* cited by examiner

*Primary Examiner* — Abdullahi Nur
(74) *Attorney, Agent, or Firm* — Han IP Corporation; Andy M. Han

(57) ABSTRACT

The present application discloses an optical sensing module, an optical mechanism of a spectrometer, and a spectrometer. An optical sensing module according to one embodiment comprises an optical sensing component and an optical fiber. The optical sensing component includes at least a row of optical sensing units. The optical fiber is made of a transparent material and has a cylindrical curved surface. A side of the cylindrical curved surface faces the optical sensing units to converge at least a portion of an incident light received by the optical sensing units. With techniques of the present application, the amount of light collected at the optical sensing component can be increased for it to be suitable for applications such as miniaturized apparatuses and systems, thus improving the overall efficiency of optical reception and utilization therein.

34 Claims, 11 Drawing Sheets

OPTICAL SENSING MODULE, OPTICAL MECHANISM OF SPECTROMETER, AND SPECTROMETER

CROSS-REFERENCE TO RELATED APPLICATION

This application is the U.S. national stage application of International Application No. PCT/CN2013/071115, filed on Jan. 30, 2013. The above-identified patent application is hereby incorporated by reference in its entirety.

TECHNICAL FIELD

Implementations of the present disclosure are generally related to an optical sensing module, and in particular, a light-converging optical sensing module, an optical mechanism of a spectrometer, and a spectrometer.

BACKGROUND

Charge-coupled devices (CCD) and complementary metal-oxide semiconductor (CMOS) devices are common types of optical sensing components adopted for applications such as digital cameras, digital camcorders, fax machines, scanners, spectrometers, etc. For fax machines, scanners and spectrometers, linear optical sensing components are usually employed. In order to enhance the efficiency of a linear CCD or CMOS sensing device, it is typical in current technology to dispose a plano-convex cylindrical lens on the sensing device, as shown in FIG. 1. The total amount of light received by the linear sensing device 1 is thus increased by the unilateral optical convergence provided by the plano-convex cylindrical lens 2, thereby improving the sensitivity and the optical reception of the sensing device. The plano-convex cylindrical lens has a flat surface for the ease of being mechanically assembled with the linear optical sensing component. Nevertheless, there exists certain difficulties in design and manufacture of plano-convex cylindrical lenses, which contribute to a higher overall cost.

As progresses are constantly made in various micro-machining and micro-manufacturing technologies, such as ones used in semiconductor processes, the miniaturization of optical apparatuses is also developing rapidly. In particular, various components of a miniaturized spectrometer may be integrated onto a single chip by replacing, to name a few, flat mirrors, planar optical gratings and converging lenses of a conventional spectrometer with concave gratings manufactured by technologies such as semiconductor processes, micro-electro-mechanical systems (MEMS) or Lithographie GaVanoformung Abformung (LIGA). Moreover, when the spectrometer with concave gratings is further furnished with a planar optical waveguide, the amount of light received at an optical sensing component of the spectrometer can be increased. Consequently, the spectrometer can have its size greatly reduced, making it more convenient to use and suitable for a wider range of applications. In contrast, a plano-convex cylindrical lens that is assembled with the optical sensing component of a conventional spectrometer is generally fabricated by methods of mechanical machining, and is thus limited in its minimal size and maximal surface curvature. This would result in difficulties for such a lens to be applied to or employed by a miniaturized spectrometer or other miniaturized optical apparatuses.

Therefore, for applications such as miniaturized spectrometers and other integrated optical apparatuses and systems, it is critical to provide a solution whereby the sensitivity and optical reception efficiency of optical sensing components can be enhanced by increasing the total amount of light received by the optical sensing components.

SUMMARY

An object of the present application is to provide an optical sensing module having a cylindrical lens integrated with an optical sensing component. When applied to a miniaturized optical apparatus, the module can increase a sensitivity and improve an optical reception efficiency of the optical sensing component, thereby enhancing the performance of the apparatus. The cylindrical lens can be a generally miniaturized optical component, but can also be realized by a piece of optical fiber for its inherent shape. Optical fibers are bendable and typically manufactured by melt-pulling a preformed body of a transparent material. They are readily available in various types at low cost, and the technologies for making them are mature. An optical fiber usually has a diameter of less than 1 mm and thus can be easily accommodated in a smaller space, making it particularly suitable for integrated optical apparatuses such as a miniaturized spectrometer.

Accordingly, one of the embodiments of the present application is manifested in an optical sensing module that comprises an optical sensing component comprising at least a row of optical sensing units and an optical fiber, wherein the optical fiber has a cylindrical curved surface (a curvilinear surface that comprises a portion or all of the curved part of a surface of a cylinder), and is disposed with a side of the cylindrical curved surface corresponding to the optical sensing units. Namely, the optical fiber is disposed with its cylindrical curved surface facing the optical sensing units, wherein the cylindrical curved surface surrounds a longitudinal axis of the optical fiber. The optical fiber is arranged to converge at least a portion of an incident light received by the optical sensing units. The incident light enters the optical fiber at a first location on the cylindrical curved surface and then exits the optical fiber at a second location on the cylindrical curved surface, wherein the second location is opposite the first location. After the incident light exits the optical fiber, it is received by the optical sensing units. The optical fiber can be disposed in various ways. For example, the optical fiber can be substantially parallel with the optical sensing units, with a constant distance maintained between the two. Or, the optical fiber can be substantially coplanar with, but not parallel to, the optical sensing units, such that the distance between the two varies linearly. The optical fiber can also be arranged not to be coplanar with the optical sensing units, with the two forming a pair of skew lines. Furthermore, a second optical fiber can be included and disposed to be parallel with the first optical fiber, or to be next to the first optical fiber along the propagation direction of the incident light. Besides, due to its bendability, an optical fiber can be bent into a curve and disposed to be substantially coplanar with the optical sensing units such that the distance between the two varies nonlinearly. Alternatively, two optical fibers with different specifications, such as different diameters or refractive indexes, can be lined up substantially on a single line, and thus generate different effects respectively. The two optical fibers can be disposed separately into the module, or can be fused together first and then disposed into the module as one integral piece. Likewise, a doped optical fiber and an un-doped optical fiber can be connected together. Since each has a respective refractive index, a respective optical convergence can be resulted. One can choose to use a gradient-index (GRIN) optical fiber, thereby omitting the step of cladding removal, making it even easier for practical applications.

In addition, the optical sensing module can include a protection cover plate, which is made of a transparent material. An optical fiber can be disposed on the internal surface of the protection cover plate (facing the optical sensing units), on the external surface of the protection cover plate (facing the incident light), or on both surfaces, by optical glue bonding or other methods. Alternatively, the optical sensing module can also include a light blocking frame made of an opaque plate that has an opening through which the incident light enters. The light blocking frame is arranged to block unnecessary lights and prevent a portion of the optical sensing units from receiving the incident light. The output signals of the blocked optical sensing units can then be used to calibrate the output signal of the optical sensing component. For this arrangement, the optical fiber can be disposed in the opening of the light blocking frame.

Another embodiment of the present application is an optical sensing module used for receiving an incident light coming from a planar waveguide. This embodiment comprises an optical sensing component comprising at least a row of optical sensing units and a cylindrical lens. The cylindrical lens has a cylindrical curved surface that faces the optical sensing units, wherein the cylindrical curved surface surrounds a longitudinal axis of the cylindrical lens. The cylindrical lens is arranged to converge at least a portion of the incident light received by the optical sensing units. The incident light enters the cylindrical lens at a first location on the cylindrical curved surface and then exits the cylindrical lens at a second location on the cylindrical curved surface, wherein the second location is opposite the first location. After the incident light exits the cylindrical lens, it is received by the optical sensing units. The cylindrical lens can be made of different materials (meaning different refractive indexes) and with different specifications (such as different diameters) according to specific needs. Similar to the embodiment previously stated, the cylindrical lens can be disposed in various ways, and a second cylindrical lens can be included as needed. Likewise, two cylindrical lenses of different diameters or materials can be disposed next to each other, with each of the two lenses respectively generating a respective optical convergence effect. For instance, the cylindrical lens may comprise a first part having a first diameter and corresponding to a section of the optical sensing units, and a second part having a second diameter and corresponding to another section of the optical sensing units. Moreover, the cylindrical lens may have a plurality of parts, with each part having a diameter that corresponds to a respective section of the optical sensing units. The cylindrical lens can be made of glass, quartz or other transparent materials, or can be realized by an optical fiber as stated previously.

Another embodiment of the present application is an optical mechanism of a spectrometer that comprises a planar waveguide and a cylindrical lens. The planar waveguide has an output port. The cylindrical lens has a cylindrical curved surface that faces the output port, wherein the cylindrical curved surface surrounds a longitudinal axis of the cylindrical lens. The cylindrical lens is such arranged as to converge at least a portion of an outgoing light from the output port of the planar waveguide. The outgoing light from the output port of the planar waveguide enters the cylindrical lens at a first location on the cylindrical curved surface and then exits the cylindrical lens at a second location on the cylindrical curved surface, wherein the second location is opposite the first location. The cylindrical lens can be made of glass, quartz or other transparent materials, or can be realized by an optical fiber. For a miniaturized spectrometer, the optical sensing component is normally disposed within 5 mm from the output port of the planar waveguide. The cylindrical lens can also be fixedly disposed at the output port of the planar waveguide, with variations in the disposition similar to those employed by the previous embodiments. In the case where the cylindrical lens is realized by an optical fiber, an optical fiber that is bent into a curve can be disposed to be substantially coplanar with the optical sensing component such that the distance between the optical fiber and the optical sensing component varies non-linearly.

Yet another embodiment of the present application is a spectrometer that comprises a dispersing element, a planar waveguide provided with an output port, an optical sensing component having at least one row of optical sensing units, and a cylindrical lens. The cylindrical lens is located between the output port and the optical sensing units, and can be disposed in various ways as described in the embodiments previously stated. The dispersing element can be, for instance, a concave grating. In addition, a light converged by the cylindrical lens (for instance, the incident light as previously stated) has been dispersed by the dispersing element.

According to the description above, each of the embodiments of the present application has a cylindrical lens, such as an optical fiber, that is integrated with an optical sensing component. The purpose of such an arrangement is to increase the amount of light collected at the optical sensing component, thereby improving the overall efficiency of optical reception and utilization. This is especially suitable for applications of miniaturized apparatuses and systems. When employed in a miniaturized spectrometer, the optical efficiency profile across wavelengths can be adjusted through changing various design parameters of the cylindrical lens. Detailed below are illustrations of preferred embodiments of the present application.

Figure 5A:
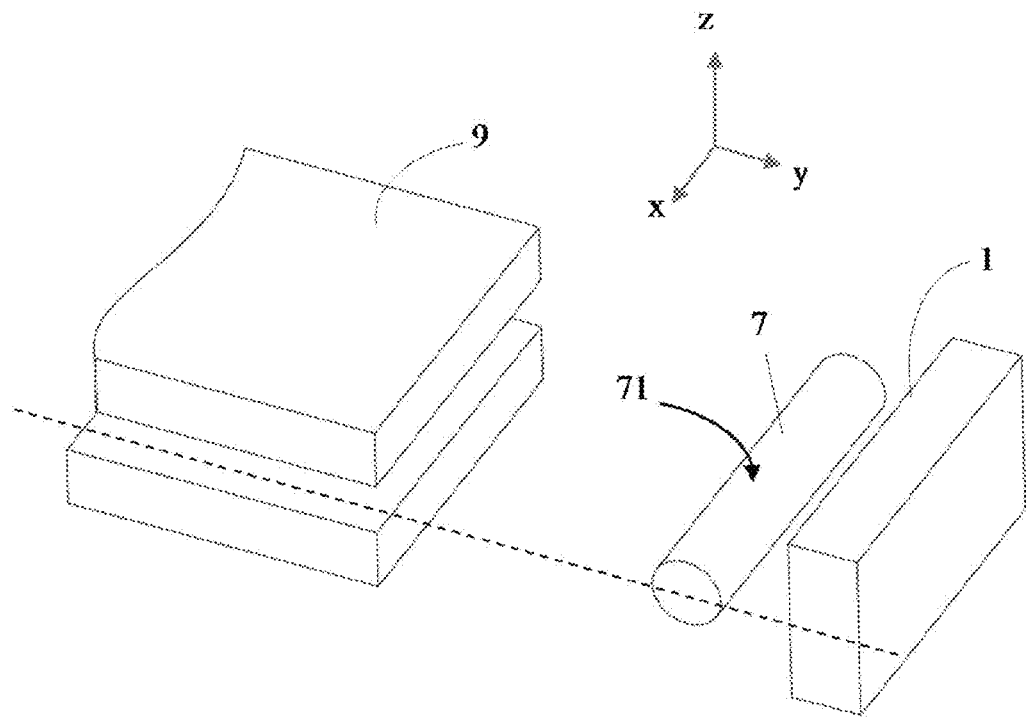
Figure 5B:
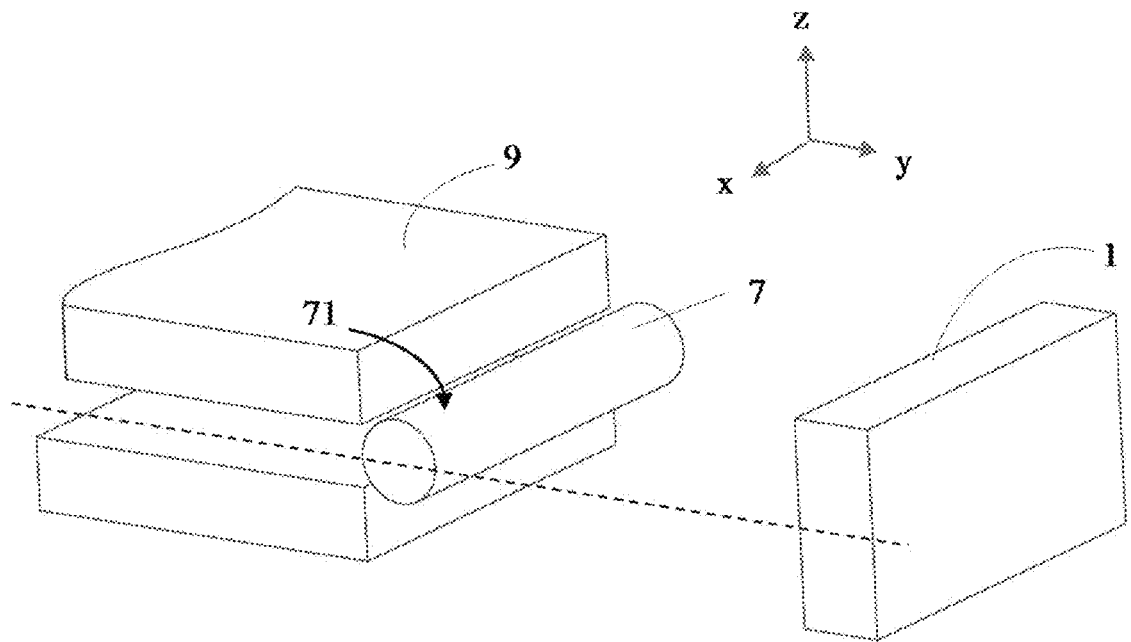

Each of FIGS. 5A and 5B is a perspective view of an optical sensing module integrated with a planar waveguide according to another embodiment of the present application.

Figure 6:
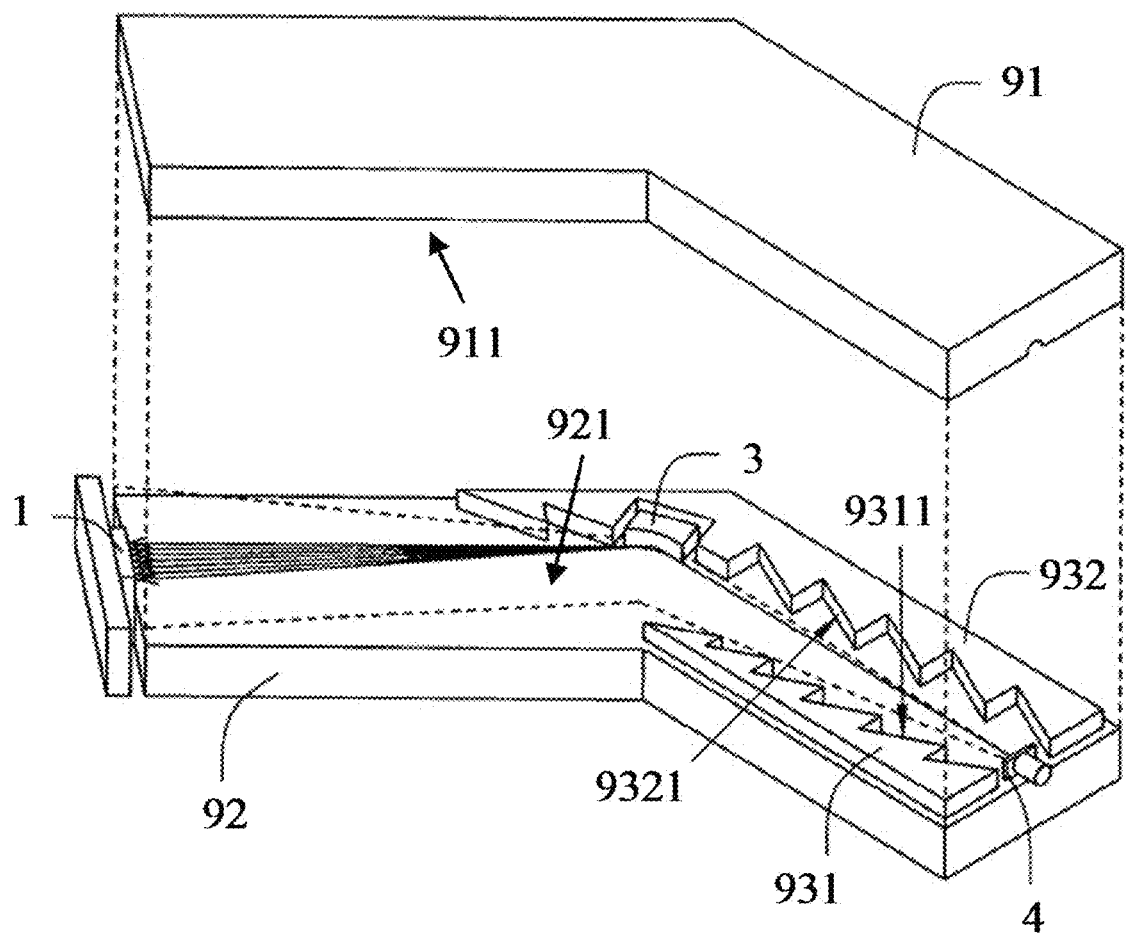

FIG. 6 is a perspective view of a miniaturized spectrometer.

Figure 7:
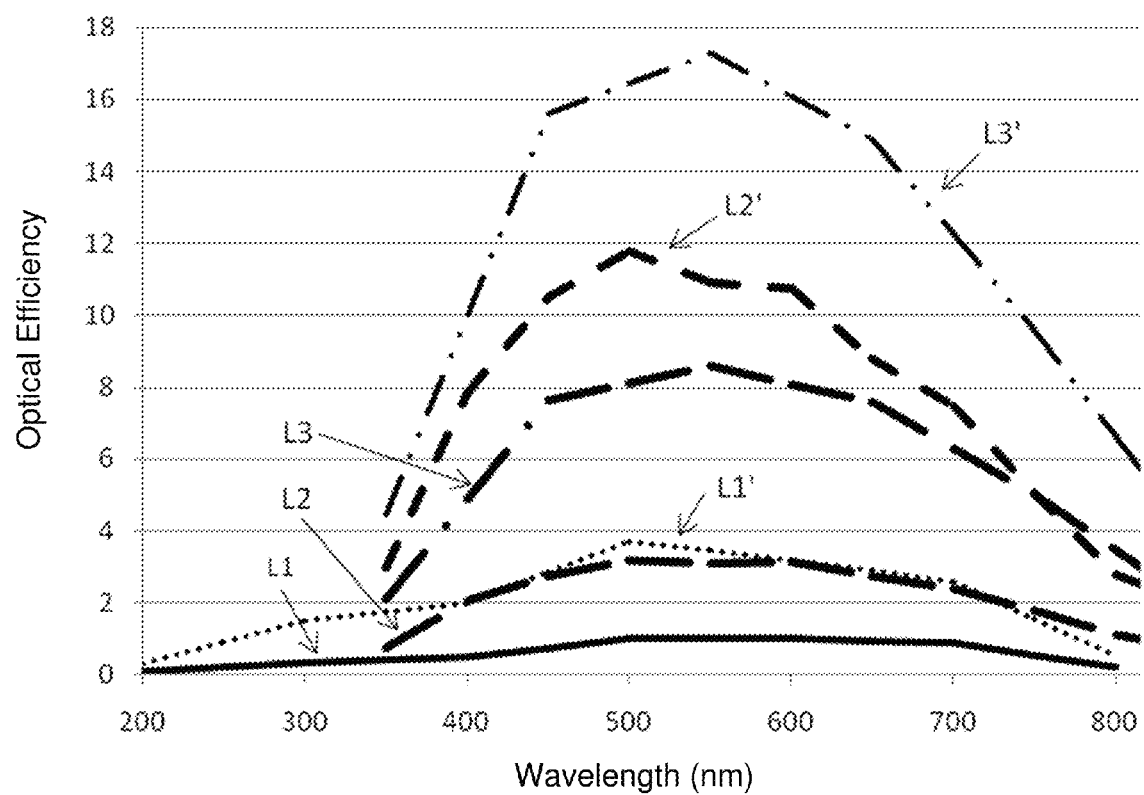

FIG. 7 is an illustration of the result of the efficiency analysis of a miniaturized spectrometer.

Figure 8A:
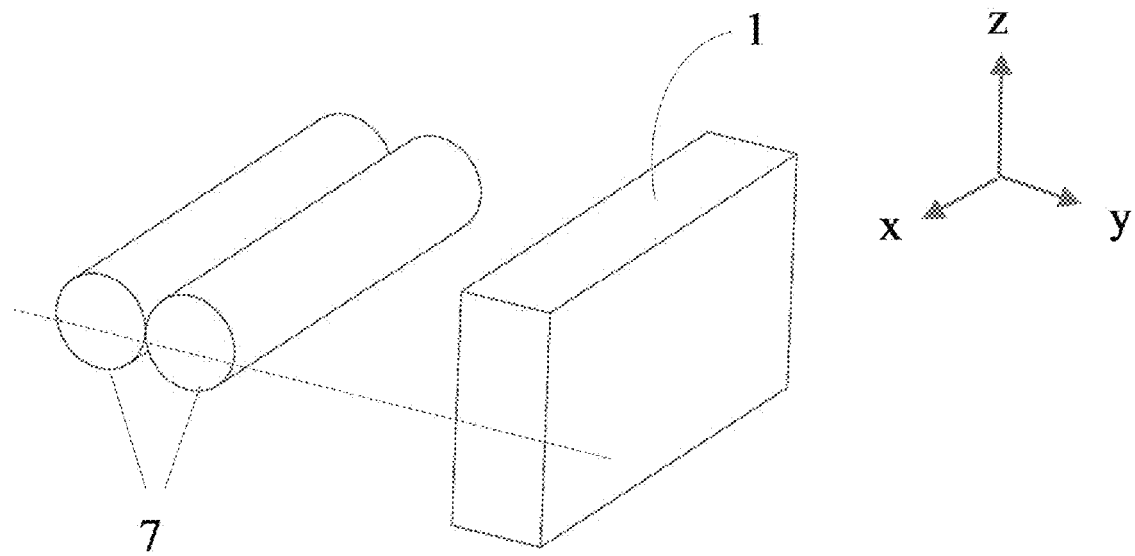
Figure 8B:
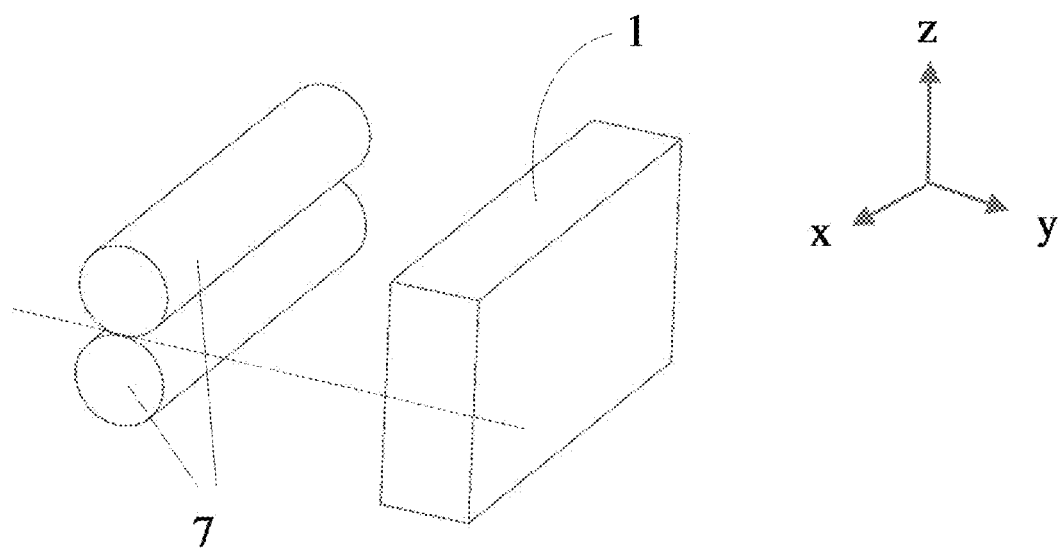

Each of FIGS. 8A and 8B is a perspective view of multiple cylindrical lenses integrated with an optical sensing component according to another embodiment of the present application.

Figure 9A:
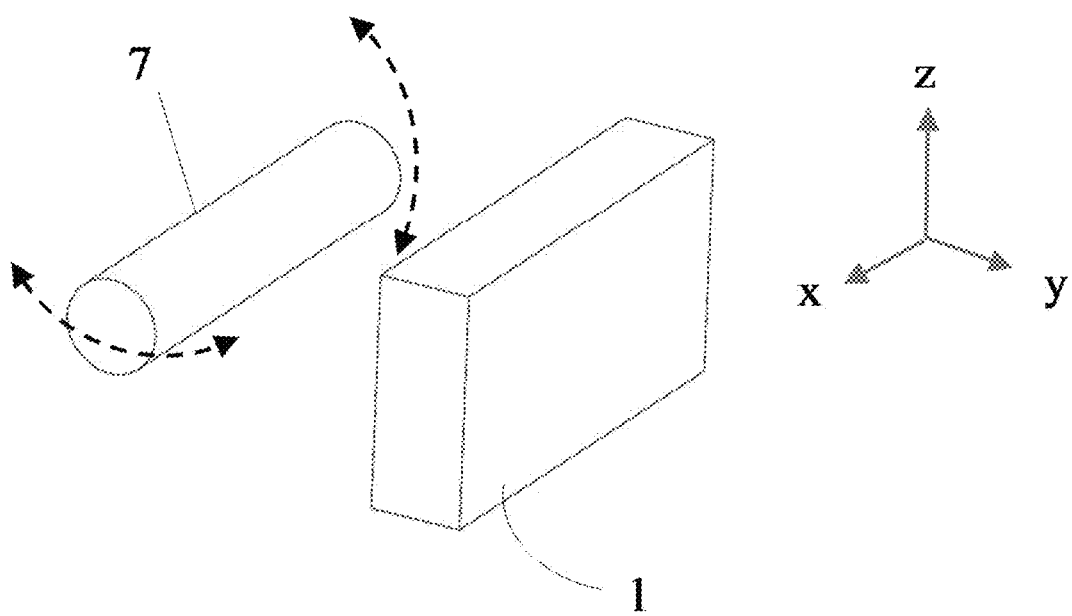
Figure 9B:
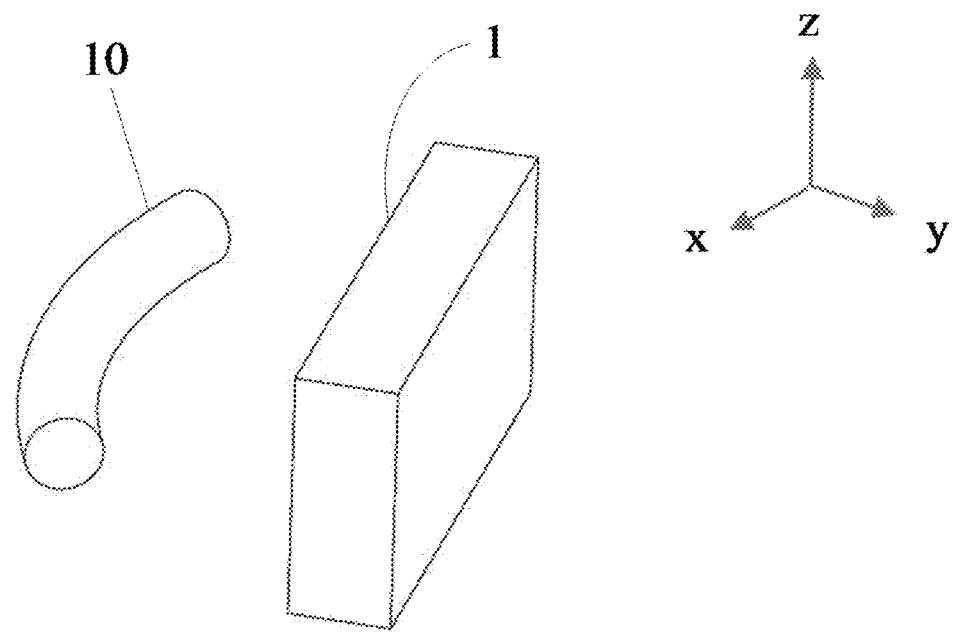

FIGS. 9A and 9B are perspective views of various types of cylindrical lenses or optical fibers, respectively, integrated with an optical sensing component according to another embodiment of the present application.

Figure 10A:
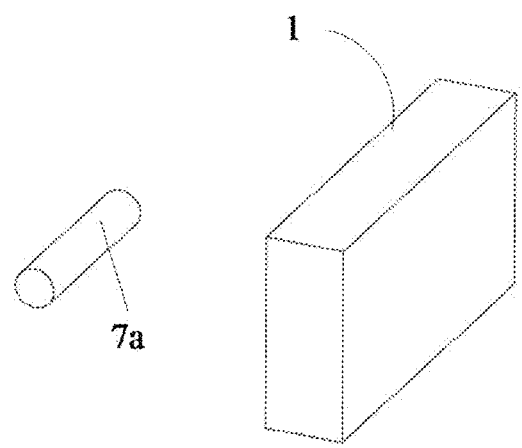
Figure 10B:
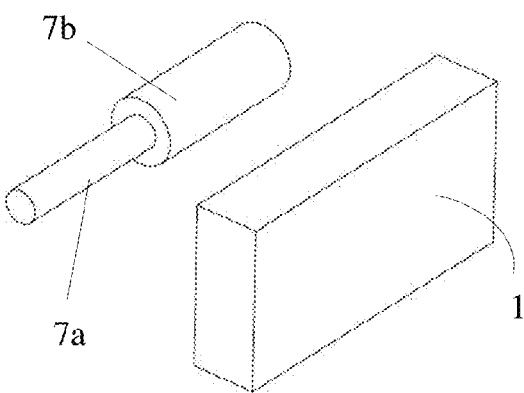
Figure 10C:
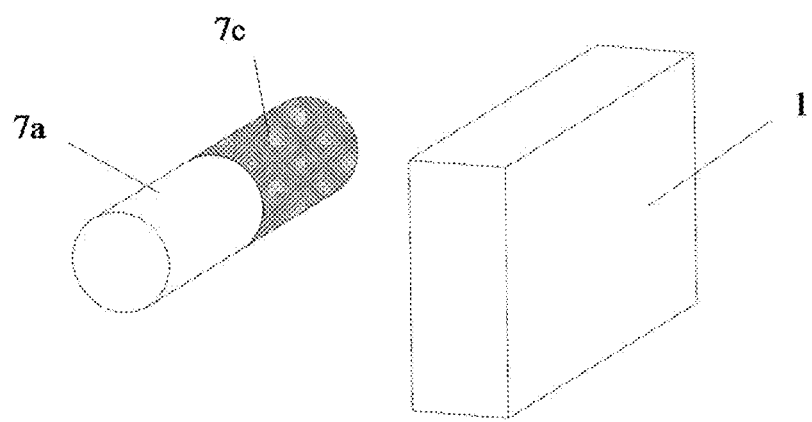

FIGS. 10A, 10B and 10C are perspective views of various types of cylindrical lenses, respectively, integrated with an optical sensing component according to another embodiment of the present application.

Figure 11A:
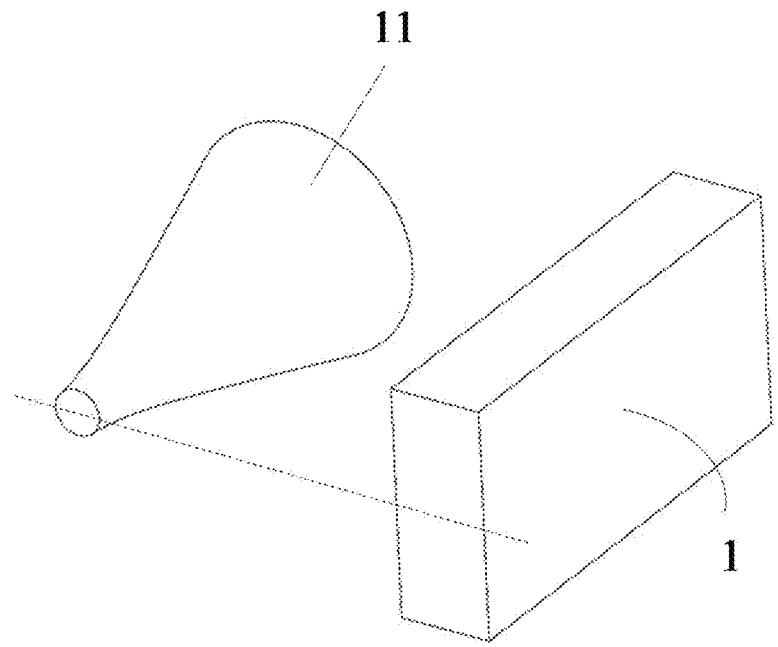
Figure 11B:
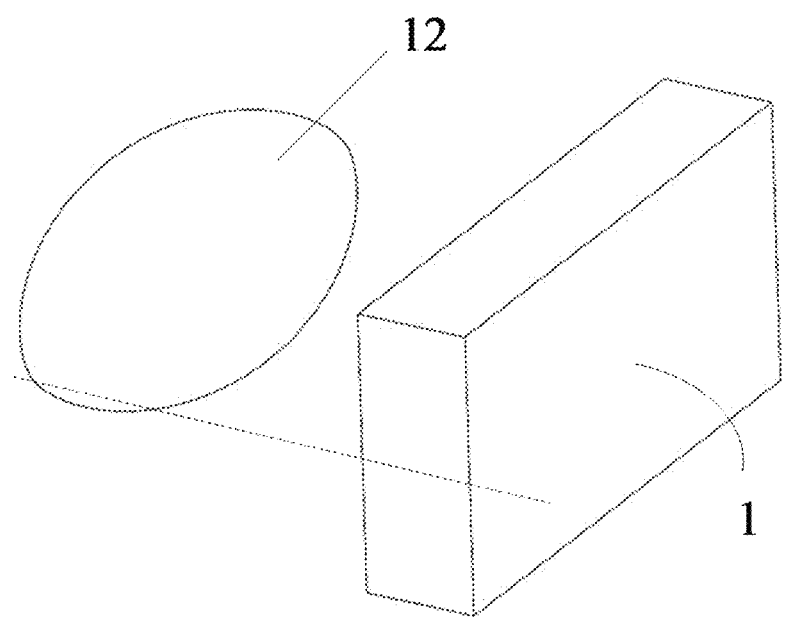

FIGS. 11A and 11B are perspective views of a cone-shaped cylindrical lens and a spindle-shaped cylindrical lens, respectively, integrated with an optical sensing component according to yet another embodiment of the present application.

NUMERICAL REFERENCES FOR MAJOR COMPONENTS

1: optical sensing component
11: optical sensing row
2: plano-convex cylindrical lens
3: concave grating
4: optical input port
5: optical sensing component
6: protection cover plate
7, 7a, 7b, 7c: cylindrical lens
71: cylindrical curved surface
8: light blocking frame
9: planar waveguide
91: upper waveguide plate
911: first reflective surface
92: lower waveguide plate
921: second reflective surface
931: first light extinction module
932: second light extinction module
9311, 9321: saw-toothed edge
10: curved optical fiber
11: cone-shaped lens
12: spindle-shaped lens

DETAILED DESCRIPTION OF PREFERRED IMPLEMENTATIONS

Based on the principles disclosed above, detailed description of various embodiments of the present application is provided below with reference to the figures. The figures are for illustration purpose only and do not represent the actual appearance, size or aspect ratio of any component therein. Same or similar components are indicated with the same labeling across the figures.

The optical reception efficiency of a spectrometer depends on the amount of light received at its optical sensing component. Therefore, a cylindrical lens disposed in the optical path of the spectrometer helps to enhance the sensitivity therein. Specifically, referring to the structure of an integrated spectrometer illustrated in FIG. 2, an incident light transmitted through the input port 4 is separated into various components by a concave grating 3 and focused onto an optical sensing component 5. The optical sensing component 5 includes a row of at least one row of optical sensing units, or pixel sensors, each of which located at a respective location in the row and configured to receive a correspondingly different optical component of the diffracted incident light at a correspondingly different optical wavelength. After signal conversion from optical domain to electrical domain, followed by post-conversion signal processing, the spectrum of the incident light is revealed. Nevertheless, the optical sensitivity of the optical sensing component is negatively affected by the optical divergence inherent in the propagation from the concave grating 3 toward the optical sensing component 5. To mitigate the issue, a cylindrical lens, such as an optical fiber, can be disposed in front of the optical sensing component 5, such that the cylindrical lens converges the light dispersed by the concave grating 3. Through adjusting relevant design parameters of the cylindrical lens, the sensitivity and thus the optical reception efficiency can be improved, the efficiency difference between different wavelengths can be compensated, and/or the efficiency of a certain wavelength band can be enhanced.

First Embodiment

Figure 3:
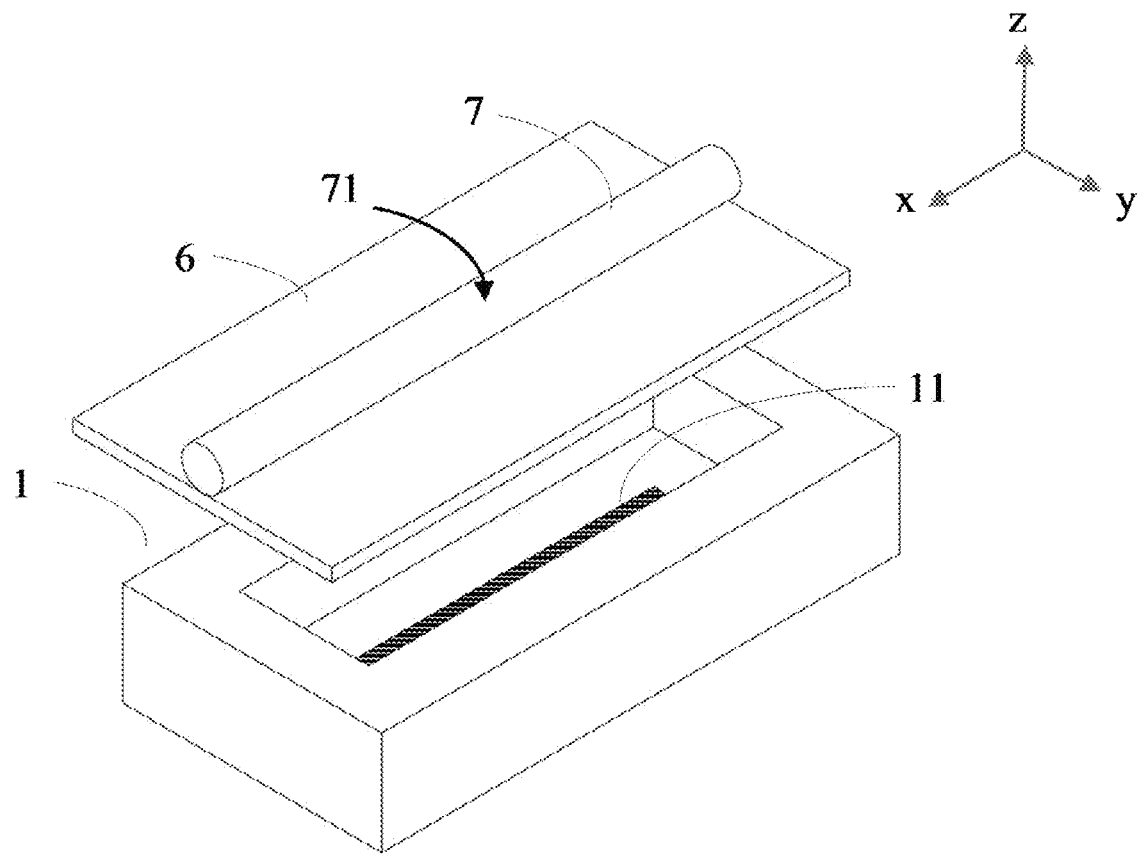
FIG. 3 is a perspective view of an optical sensing module according to an embodiment of the present application.

A first embodiment of the present application is an optical sensing module having a cylindrical lens, as shown in FIG. 3. The optical sensing module comprises an optical sensing component 1 and a protection cover board 6. The optical sensing component 1 converts optical signals to electrical signals through photoelectric effect, and comprises an optical sensing row 11 that comprises a plurality of sensing units. Depending on practical needs, more than one row of optical sensing units can be employed, and thus the width of the optical sensing module (along y direction of the figure) ranges roughly between several tens of millimeter and several hundreds of millimeter. In this embodiment, the cylindrical lens 7 is disposed on an outer surface of the protection cover board 6 (along +z direction of the figure) to simplify the assembly, and can be fixed by various methods such as UV optical glue bonding. The cylindrical lens 7 is disposed to be substantially parallel with the optical sensing row 11 (along x direction of the figure), with a side of its cylindrical curved surface 71 corresponding to the optical sensing row 11. Namely, the cylindrical lens 7 is disposed such that the cylindrical curved surface 71 faces the optical sensing row 11. The amount of light received by the optical sensing component 1 is therefore increased due to the optical convergence in the y direction of the figure provided by the cylindrical curved surface 71. As illustrated in FIG. 3, the cylindrical curved surface 71 surrounds a longitudinal axis of the cylindrical lens 7. Thus, a light (not shown in the figure) incident on the cylindrical curved surface 71 would enter the cylindrical lens 7 at a first location on the cylindrical curved surface 71 and then exits the cylindrical lens 7 at a second location on the cylindrical curved surface 71, wherein the second location is opposite the first location. After the incident light exits the cylindrical lens 7, it is received by the optical sensing row 11. In another embodiment, one of ordinary skill in the art may change the disposition location of the cylindrical lens 7 according to one's specific needs. For example, the cylindrical lens 7 can be disposed on the inner surface of the protection cover plate 6 (−z direction of the figure) to provide better protection to the cylindrical lens.

The optical sensing component 1 stated above can be, for example, charge-coupled devices (CCD), complementary metal-oxide semiconductor (CMOS) devices, or a photo-diode array. The protection cover plate 6 is a plate made of transparent material such as glass or quartz, used to protect the optical sensing units and prevent them from being contacted with ambient dusts or moisture. The protection cover plate 6 can be further processed to provide, for instance, a surface coating that reflects less incident light or rejects certain wavelengths therein. In the present embodiment, the distance between the cylindrical lens 7 and the optical sensing row 11 remains constant; the constant distance, combined with the choice of a variety of diameters for the cylindrical lens 7 (i.e., a variety of focal lengths), can achieve various desired. The fixed distance is not necessarily equal to the focal length of the cylindrical lens 7. When more than one optical sensing row are employed, a better design could dictate the fixed distance be different from the focal length of the cylindrical lens 7, thereby making all optical sensing rows receive the converged light. Alternatively, materials of various refractive indexes can be used for the cylindrical lens 7 to achieve various focal lengths and therefore various optical convergence effects.

For the present embodiment, the cylindrical lens 7 can be implemented, as one of many options available, by an optical fiber. In such case the cylindrical curved surface 71 surrounds the longitudinal axis of the cylindrical lens of the optical fiber which is the cylindrical lens 7. An optical fiber usually has a diameter of about 1 mm or less, is made of high transparency (low absorption) material, and is suitable for applications of miniaturized optical apparatuses or systems. Furthermore, optical fibers have been widely used in optical communications, manufactured with mature technologies, and are easily available at low cost in many types manifested in various materials, diameters and configurations. In addition, a range of different processing technologies have been developed for optical fibers, such as Erbium-doped fibers used as the amplifying material in Erbium-doped fiber amplifiers, and ultraviolet exposure technologies used for optical fiber grating fabrication. Therefore, in addition to all the advantages stated above, employing an optical fiber as the cylindrical lens provides more flexibility in terms of design and applications.

Second Embodiment

Figure 4:
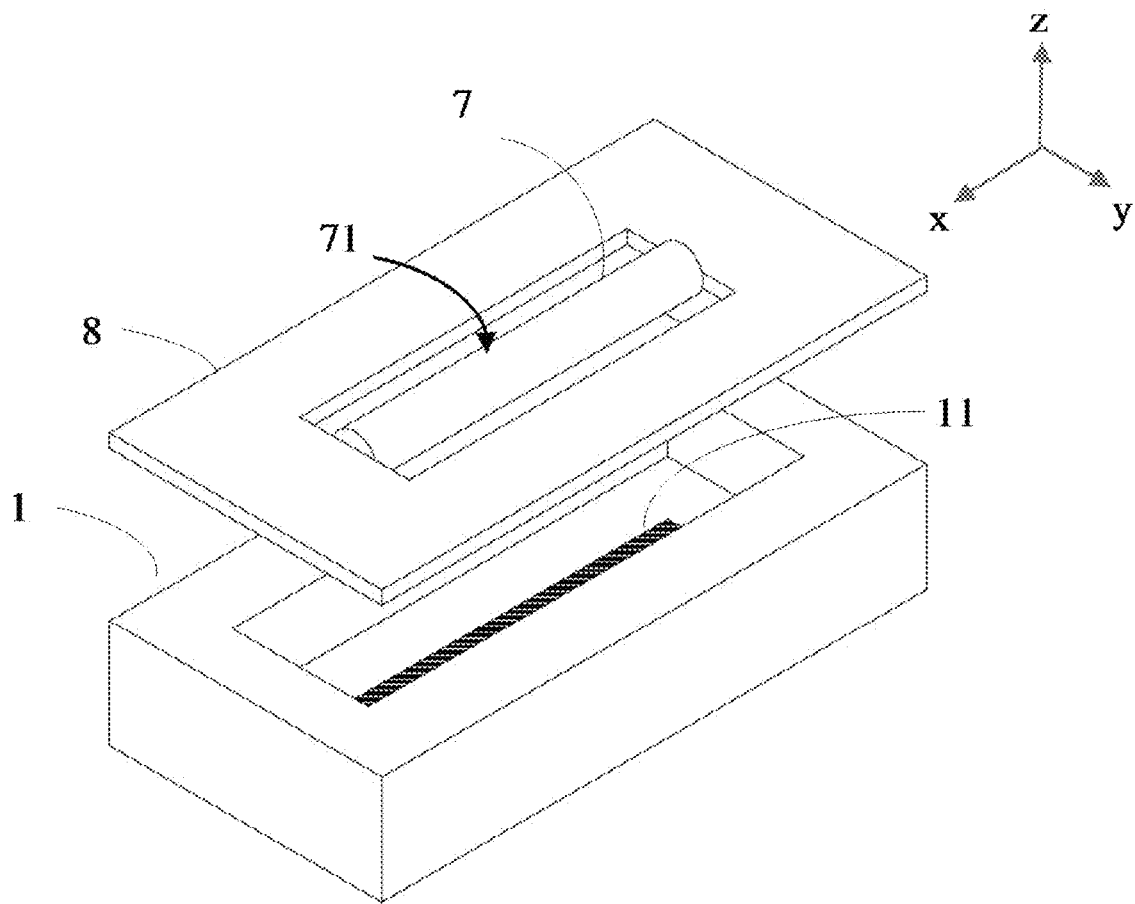
FIG. 4 is a perspective view of an optical sensing module according to another embodiment of the present application.

A second embodiment of the present application is an optical sensing module having a cylindrical lens that is integrated with a light blocking frame, as shown in FIG. 4. The optical sensing module comprises an optical sensing component 1, an optical sensing row 11 and a light blocking frame 8. The light blocking frame 8 is an opaque plate having an opening, with a cylindrical lens 7 cylindrical lens 7 disposed in the opening. Same as described in the first embodiment, the cylindrical lens 7 is substantially parallel with the optical sensing row 11, with its cylindrical curved surface 71 facing the optical sensing row 11. The amount of light received by the optical sensing component 1 is therefore increased due to the optical convergence in the y direction.

Moreover, the light blocking frame 8 is employed not only to block stray lights, but also to assist in calibrating an output signal of the optical sensing component 1. Due to its intrinsic dark current, the optical sensing component would produce an electrical output signal even when it does not receive an optical input. This electrical output is a major source of noise, as it is usually dependent on ambient factors such as temperature. To address the noise issue resulted from the dark current and other causes, the light blocking frame 8 of the present embodiment is employed to block a portion of the optical sensing row 11 such that the portion does not receive light. Output signals from the blocked sensing units can thus be used as a reference to calibrate output signals from the rest of the sensing units that do receive light, thereby suppressing or even removing the noise interference. The cylindrical lens 7 can be disposed in the opening of the light blocking frame 8, as previously stated, with the length of the cylindrical lens 7 in the x direction being approximately equal to the length of the opening in the same direction, as shown in the figure. This disposition can be achieved by methods such as glue bonding or snap fitting. It can also be chosen, as in other embodiments, to employ a longer cylindrical lens, the length of which in the x direction is greater than the length of the opening in the same direction. The longer cylindrical lens can be fixedly disposed at a primary surface of the light blocking frame by means of, for example, glue bonding. Similar to the first embodiment, by adjusting design parameters of material and diameter of the cylindrical lens 7 with respect to the distance between the cylindrical lens 7 and the optical sensing row 11, desired results can be achieved. Likewise, the cylindrical lens 7 can also be an optical fiber to facilitate application of the present embodiment in miniaturized optical apparatuses or systems.

Third Embodiment

In a third embodiment of the present application, a cylindrical lens is integrated with a planar waveguide and an optical sensing component, as shown in FIGS. 5A and 5B. In particular, the planar waveguide 9 comprises two planes that are disposed to be substantially parallel with one another (and also parallel to the x-y plane of the figure). Propagation of light within the planar waveguide 9 is mostly achieved by reflections at the two planes. To receive the light from the planar waveguide 9, an optical sensing component 1 is disposed at an output port of the planar waveguide 9. The optical sensing component 1 comprises at least one row of optical sensing units (not shown in the figure due to perspective angle) in the x direction, with the optical sensing units corresponding to the output port of the planar waveguide 9, and is therefore suitable for fitting the structural geometry of the planar waveguide 9. Nevertheless, the light would diverge in the +z and −z directions of the figure after it exits the output port of the planar waveguide 9, resulting in the optical sensing component 1 not being able to receive all the light from the planar waveguide 9. In order to enhance the optical reception efficiency of the optical sensing component 1, the arrangement disclosed in the present embodiment employs a cylindrical lens 7 that is disposed in the x direction between the planar waveguide 9 and the optical sensing component 1. The cylindrical lens 7 is substantially parallel with the optical sensing component 1, with a side of its cylindrical curved surface 71 corresponding to an optical sensing row of the optical sensing component 1, and with an opposite side of its cylindrical surface corresponding to the output port of the planar waveguide 9. Namely, the cylindrical lens 7 is disposed between the output port of the planar waveguide 9 and the optical sensing component 1. Thanks to the optical convergence of the cylindrical curved surface 71 of the cylindrical lens 7 in z direction, the light which would otherwise have diverged is now converged onto the optical sensing row of the optical sensing component 1.

Two assembly arrangements are disclosed in the present embodiment; yet, one of ordinary skill in the art may modify the arrangements according to one's specific needs. A first arrangement of the present embodiment is illustrated in FIG. 5A, where the cylindrical lens 7 is disposed at, and connected with, the optical sensing component 1. In the figure, this is illustrated with the two parts being placed in close proximity. In reality, the cylindrical lens 7 and the optical sensing component 1 can be integrated as one module, like the optical sensing modules disclosed in the first and second embodiments. Hence, relevant detail descriptions stated previously regarding the optical sensing modules are applicable here in the present embodiment. A second arrangement of the present embodiment is illustrated in FIG. 5B, where the cylindrical lens 7 is disposed at the output port of the planar waveguide 9. In this arrangement, the cylindrical lens 7 and the planar waveguide 9 can be integrated by methods such as glue bonding, snap fitting, etc. Furthermore, a second-order optical filter (not shown in the figure) can also be disposed at the out port of the planar waveguide 9 for the purpose of filtering out second order refraction lights. The cylindrical lens 7 can be disposed on a surface of the second-order optical filter. In the present embodiment, the planar waveguide 9 may comprise two reflective planes, with the air between the two planes serving as the propagation medium. Alternatively, the planar waveguide 9 may be a slab waveguide made of a transparent dielectric material, within which light propagates by means of total reflections. One of ordinary skill in the art may use a different type of waveguide according to one's specific needs. For the planar waveguide 9 that comprises two reflective planes, one can choose to use a cylindrical lens 7 whose diameter matches the height of the planar waveguide 9 in z direction, and fit the cylindrical lens 7 directly between the two reflective planes at the output port. For planar waveguides used in the application of miniaturized spectrometers, this height is about 150 mm.

Next to be presented is the resulted performance, manifested through numerical simulations, of a practical optical system where a cylindrical lens is integrated therein through employment of aforementioned embodiments. Referring to Taiwan Patent Publication No. 201140148, a perspective view of a disassembled optical mechanism of a miniaturized spectrometer is shown in FIG. 6. The major parts of the optical mechanism includes an input port 4, an optical sensing component 1, a concave grating 3, an upper waveguide plate 91, a lower waveguide plate 92, a first light extinction module 931 and a second light extinction module 932, wherein the upper waveguide plate 91 is provided with a first reflective surface 911 (not shown in the figure due to perspective angle) and the lower waveguide plate 92 is provided with a second reflective surface 921 opposite the first reflective surface 911. The first reflective surface 911 and the second reflective surface 921 are disposed to be substantially parallel with one another, forming within the two parts an optical passage where a light entering through the input port 4 propagates by means of successive reflections between the first reflective surface 911 and the second reflective surface 921. In general, the optical passage is a cavity, and the air therein is used as a medium for optical propagation. Rather, one can option to fill the cavity with other transparent media such as glass, plastic or acrylic resin. The material used for the first reflective surface 911 and the second reflective surface 921 needs to be reflective, such as stainless steel, silicon wafer, glass, CD/DVD discs or hard drive discs. Highly reflective films, such as aluminum films, can also be formed on the first reflective surface 911 and the second reflective surface 921, respectively, thereby increasing the reflection and thus the overall efficiency of optical utilization.

Figure 2:
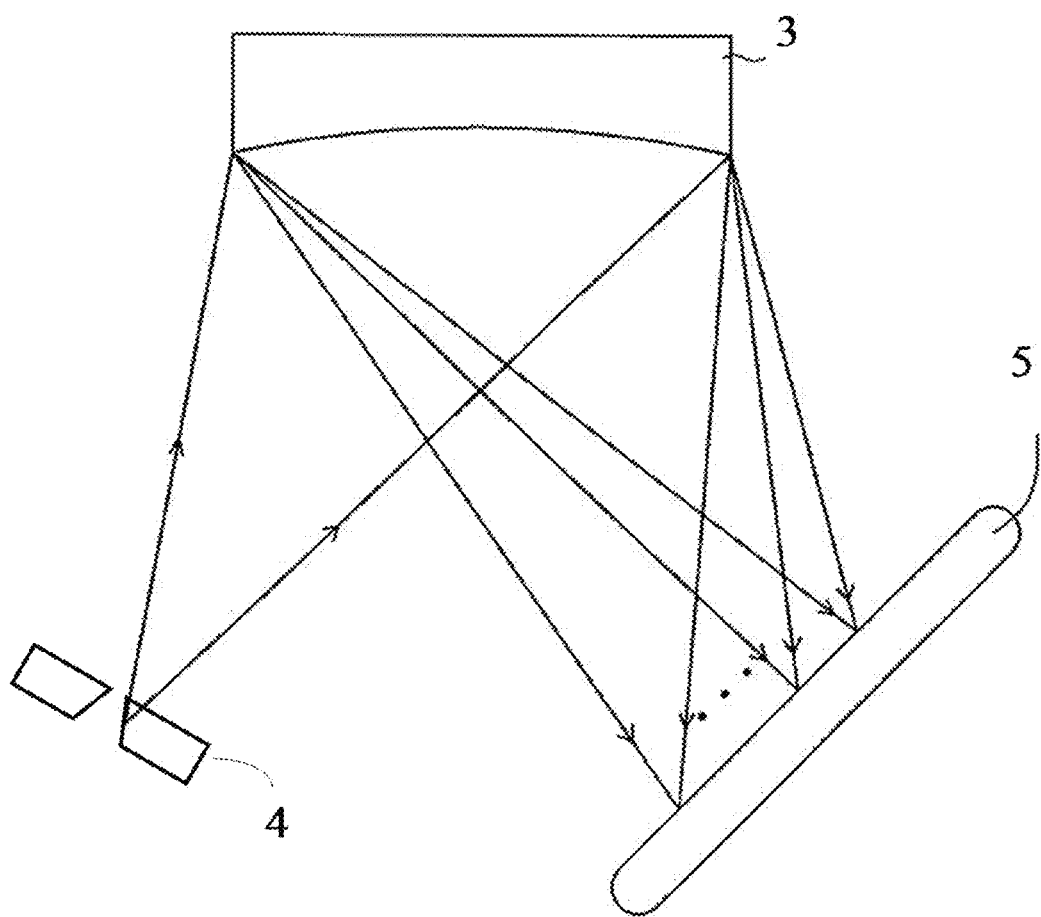
FIG. 2 is an illustration of an integrated spectrometer.

Similar to FIG. 2, the arrangement of FIG. 6 has an incident light coming through the input port 4, and the incident light is diffracted into various components of respective wavelengths by the concave grating 3. Each of the component is converged onto a respective location of the optical sensing component 1. Moreover, in addition to providing a function of reducing interference from stray lights, the first light extinction module 931 and the second light extinction module 932 also serve as spacers between the upper waveguide plate 91 and the lower waveguide plate 92. The employment of the light extinction modules for reducing stray light interference is only one of the options chosen for the present embodiment. One of ordinary skill in the art may choose to use other types of spacers, and/or ways of reducing stray lights. As illustrated in FIG. 6, a side of each of the first light extinction module 931 and the second light extinction module 932 that faces the optical passage is provided with a saw-toothed edge, 9311 and 9321 respectively, for the purpose of trapping any light that is incident from the input port 4 with an incident angle larger than a certain threshold angle.

Figure 1:
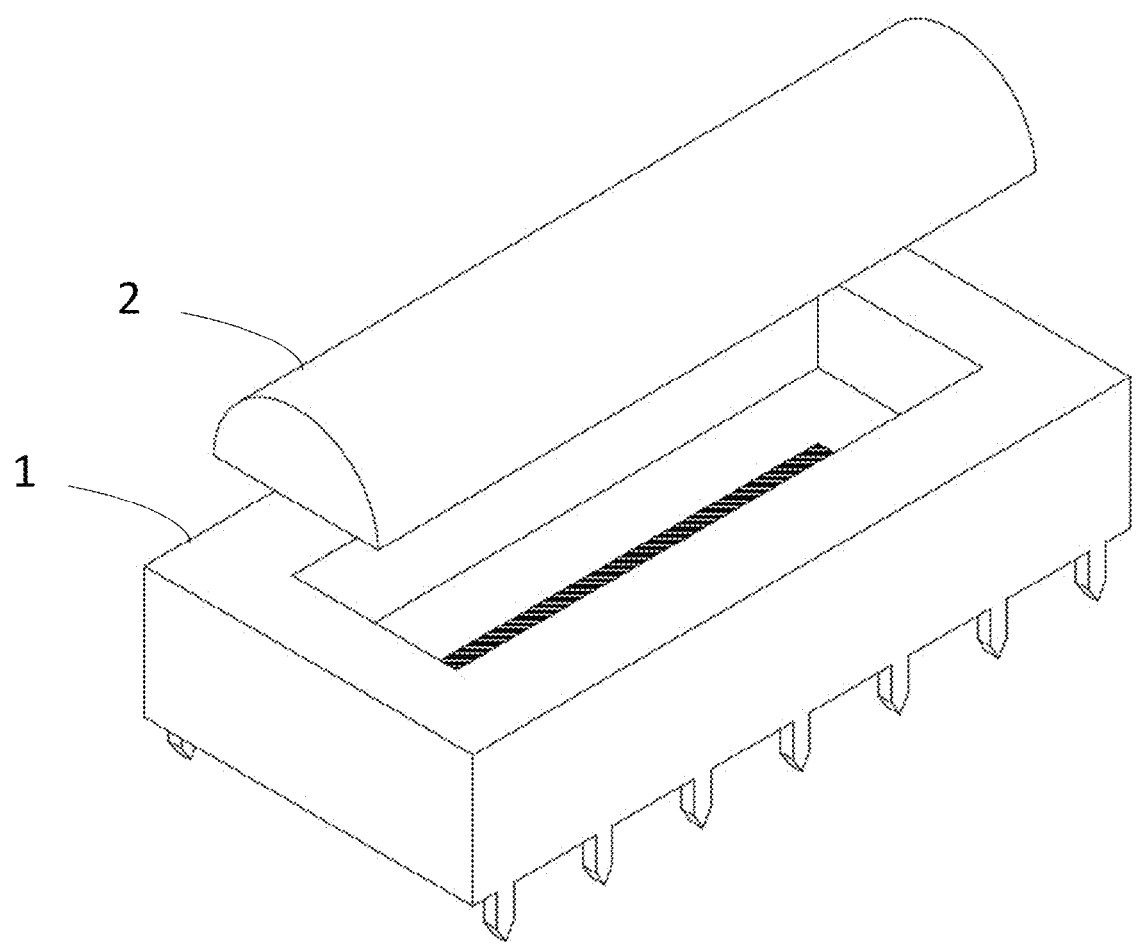
FIG. 1 is a perspective view of a prior art where a plano-convex cylindrical lens is integrated with a linear optical sensing component.

For a practical spectrometer assembly, the optical sensing component 1 does not abut an end of the optical passage. Rather, a spacing of about 5 mm is present between the optical sensing component 1 and the end of the optical passage. Disposing an prior art such as one shown in FIG. 1 in this small spacing would have resulted in difficulties in assembling, and the plano-convex cylindrical lens would have had a focal length that is longer than desired (i.e., the curvature thereof would have been too small). On the contrary, the problem can be easily solved by applying the optical sensing module previously disclosed in either the first embodiment (FIG. 3) or the second embodiment (FIG. 4) of the present application. A demonstration is shown in FIG. 7, where optical analysis is performed for a spectrometer arrangement of FIG. 6 that employs an optical sensing module of FIG. 4, as compared to another spectrometer arrangement that is substantially identical except for the lack of the cylindrical lens. Three different settings of waveguide geometries and concave gratings are analyzed for each of the two arrangements. In particular, parameters such as reflection efficiencies of the first reflective surface 911 and the second reflective surface 921, as well as sensitivity of the optical sensing component 1, are included in a figure of merit of the analysis.

In FIG. 7, curves labeled as L1, L2 and L3 represent, respectively, the optical efficiency (the figure of merit of the analysis) under the three settings for the spectrometer arrangement that does not employ a cylindrical lens. On the other hand, curves labeled as L1', L2' and L3' represent, respectively, the optical efficiency under the same three settings for the spectrometer arrangement that does employ a cylindrical lens. It can be clearly concluded from the analysis result that, for all three settings, the overall spectrum efficiency is significantly improved with the employment of a cylindrical lens. Although the demonstration is illustrated using spectrometers, the conclusion is applicable to other optical systems that exhibit a same or similar basic structure, such as a wavelength division demultiplexer (WDDM) that is commonly used in optical communication systems.

Fourth Embodiment

A fourth embodiment of the present application is shown in FIGS. 8A and 8B. For each of the previously stated embodiments of the present application, a single cylindrical lens is employed to increase the light reception of an optical sensing component. However, for various applications, multiple cylindrical lenses can be combined to provide a greater flexibility in designing optical apparatuses or systems, achieving performances of desire. Take FIG. 8A as an example, two cylindrical lenses 7 are disposed in an optical path, with both lenses substantially parallel with an optical sensing component 1 (along x direction of the figure), and the plane defined by the two cylindrical lenses and the optical sensing component 1 is parallel with x-y plane of the figure. This arrangement increases the optical convergence in z direction. In cases where the specifications of the cylindrical lens 7 and the optical sensing component 1 are somehow limited, a single cylindrical lens 7 may not achieve the desired performance (say, for instance, the focal length is too long and thus not able to converge light onto the optical sensing component 1). For such cases, a better performance can be obtained by using two or more cylindrical lenses 7 in combination and adjusting the spacing among the lenses as well as the distance from the lenses to the optical sensing component 1. The cylindrical lenses can be disposed following similar ways described in the first embodiment or the second embodiment. For instance, each of the two cylindrical lenses can be disposed on each of the two surfaces of the protection cover plate 6 or of the light blocking frame 8. Although FIG. 8A discloses using two substantially identical cylindrical lenses, the embodiment can also option to use two cylindrical lenses of different diameters and/or materials. In FIG. 8B, two cylindrical lenses are disposed side-by-side, with a plane defined by the two lenses substantially parallel with x-z plane of the figure. Likewise, a design according to FIG. 8B is suitable for applications where the specifications of the cylindrical lens 7 and the optical sensing component 1 are somehow limited, and is also suitable for applications where the optical sensing component comprises multiple rows of optical sensing units.

Fifth Embodiment

A fifth embodiment of the present application is shown in FIGS. 9A and 9B. For each of the previously stated embodiments of the present application, the cylindrical lens(es) 7 is (are) disposed to be substantially parallel with the optical sensing component 1 (along x direction of FIGS. 3-5 and 8). With the distance between the two maintained constant, the cylindrical lens(es) 7 has (have) substantially the same effect on each of the optical sensing units of the optical sensing component 1. Consequently, as shown in FIG. 7, when a cylindrical lens 7 is incorporated in a spectrometer, the optical efficiency is improved by the same ratio for all wavelengths. It can also be observed from FIG. 7 that, optical efficiency is different at different wavelengths, regardless if a cylindrical lens is incorporated or not. However, for some applications, it may be required that optical efficiency remains same or similar across wavelengths. For other applications, it may be required that optical efficiency is higher for a specific band or bands of wavelengths. Requirements like these can be fulfilled by the present embodiment. As shown in FIG. 9A as an example, the cylindrical lens 7 that had been substantially parallel with x direction is now rotated about z axis by a certain angle, such that the cylindrical lens 7 remains parallel with x-y plane while the distance in y direction between the cylindrical lens 7 and the optical sensing component 1 varies linearly. As such, the cylindrical lens 7 will not have the same effect on all sections of the optical sensing component 1; instead, it will create differences in optical efficiency improvement across different sections of the optical sensing component 1. Alternatively, the cylindrical lens 7 that had been substantially parallel with x direction can be rotated about y axis by a certain angle, such that the cylindrical lens 7 remains parallel with x-z plane but does not have the same effect on all sections of the optical sensing component 1. This provides another way of changing the optical efficiency profile across wavelengths.

Furthermore, when an optical fiber is used as the cylindrical lens, as previously stated in some embodiments, the optical fiber can, thanks to its bendability, be bent into a curve and disposed as illustrated in FIG. 9B. In FIG. 9B, the curved optical fiber 10 is substantially parallel with x-y plane and provides a nonlinearly varying distance from the optical sensing component 1 in y direction. By adjusting the position of curved optical fiber 10 in y direction, one can enhance the optical efficiency more for the center portion of the optical sensing component 1 than for the end portions, or, alternatively, enhance the optical efficiency more for the end portions than for the center portion. As an example, if a curved optical fiber 10 is employed such that the optical efficiency enhancement of its center portion is less than that of its end portions, the curves of FIG. 7 would be more flat at the top, as the optical efficiency across wavelengths would be somewhat equalized.

Sixth Embodiment

A sixth embodiment of the present application is shown in FIGS. 10A, 10B and 10C. As stated previously for the fifth embodiment, the cylindrical lens (which could be an optical fiber) can be designed and/or disposed differently for the purpose of adjusting the curve profile of optical efficiency across wavelengths. Various designs of the cylindrical lens are further proposed in the present embodiment. Firstly, as shown in FIG. 10A, a shorter cylindrical lens 7a is employed whose length is shorter than the length of an optical sensing row of the optical sensing component 1 (along x direction of the figure). As such, the amount of light received is increased for only a portion of the optical sensing units, as dictated by practical needs. When such a shorter cylindrical lens is used in, for instance, the spectrometer of FIG. 6, the efficiency of a certain band of wavelengths is increased. The wavelength range covered in the band of increased efficiency can be controlled by adjusting the length of the cylindrical lens 7a as well as its location in x direction. Secondly, as shown in FIG. 10B, two cylindrical lenses 7a and 7b, of different diameters, are combined to achieve different convergence effects respectively. The respective diameters and lengths of the cylindrical lenses are adjustable parameters, and, when applied to a spectrometer, can be used to alter the curve profile of optical efficiency across wavelengths. Moreover, cylindrical lenses 7a and 7b can be separately fixed to the protection cover board or the light blocking frame that are described in previous embodiments. Alternatively, cylindrical lenses 7a and 7b can first be connected by means of, for instance, glue bonding, and then disposed as an integral part with respect to the optical sensing component 1 according to the needs. In the case where cylindrical lenses 7a and 7b are realized by optical fibers with different diameters, the two lenses can be connected together by means of fiber splicing. Lastly, as shown in FIG. 10C, two cylindrical lenses 7a and 7c, of different refractive indexes, are connected to achieve different convergence effects. This can be realized, for instance, by fusing together two different types of optical fibers that have the same diameter but different refractive indexes. Alternatively, given that some glass materials can have their refractive indexes changed through ion exchange, it is possible to realize the embodiment of FIG. 10C by applying an ion-exchange process to part of an originally homogeneous cylindrical lens and thus changing the refractive index of that part of the lens.

Seventh Embodiment

A seventh embodiment of the present application is shown in FIGS. 11A and 11B. Aside from the cylindrical lenses and optical fibers used in the previous embodiments, an embodiment of the present application can also employ a quasi-cylindrical lens whose diameter and/or focal length is not a constant. Namely, a quasi-cylindrical lens can be used in place of the cylindrical lens or optical fiber in the previous embodiments, as illustrated in FIGS. 11A and 11B. Specifically, an arrangement of a cone-shaped lens 11 and an optical sensing component 1 is disclosed in FIG. 11A. The cone-shaped lens 11 functions similarly to the mutually connected optical fibers of FIG. 10B, but further exhibits a continuously varying diameter and focal length which can be used for adjusting for each of the optical sensing units the incident light received individually. When applied in a spectrometer, the embodiment of FIG. 11A serves a purpose of adjusting the efficiency profile of both the longer wavelength band and the shorter wavelength band. Moreover, an arrangement of a spindle-shaped lens 12 and an optical sensing component 1 is disclosed in FIG. 11B. The spindle-shaped lens 12 functions similarly to the curved optical fiber of FIG. 9B, causing a different effect to the center portion as opposed to the end portions. When applied in a spectrometer, the embodiment of FIG. 11B serves a purpose of adjusting the efficiency profile of the middle wavelength band as opposed to the long and short wavelength bands.

In summary, although specific embodiments of the present invention have been described herein for purpose of illustration, by no means are they to be interpreted as limiting the scope of the present invention. Various modifications may be made without departing from the spirit and scope of the present invention. Accordingly, the present invention is not limited except as by the appended claims.

What is claimed is:

1. An optical sensing module, comprising:
    an optical sensing component comprising at least a row of optical sensing units; and
    at least one optical fiber made of a transparent material and having a cylindrical curved surface, the at least one optical fiber disposed with the cylindrical curved surface facing the optical sensing units to converge at least a portion of an incident light received by the optical sensing units, wherein the cylindrical curved surface surrounds a longitudinal axis of the at least one optical fiber.

2. The optical sensing module of claim 1, wherein the incident light enters the at least one optical fiber at a first location on the cylindrical curved surface and exits the at least one optical fiber at a second location on the cylindrical curved surface, subsequently received by the optical sensing units, and wherein the second location is opposite the first location.

3. The optical sensing module of claim 1, wherein the at least one optical fiber is arranged such that the incident light is converged along a direction perpendicular to a plane defined by the longitudinal axis of the at least one optical fiber and the optical sensing units.

4. The optical sensing module of claim 1, wherein the at least one optical fiber is substantially parallel with a direction in which the optical sensing units are arranged.

5. The optical sensing module of claim 4, wherein the at least one optical fiber comprises a plurality of optical fibers that are substantially parallel with each other and substantially coplanar with the optical sensing units.

6. The optical sensing module of claim 4, wherein the at least one optical fiber comprises a plurality of optical fibers that are substantially parallel with each other, and wherein a plane defined by the plurality of optical fibers is substantially parallel to a surface of the optical sensing units.

7. The optical sensing module of claim 1, wherein the at least one optical fiber is substantially coplanar but not parallel with the optical sensing units.

8. The optical sensing module of claim 1, wherein the at least one optical fiber is curved and substantially coplanar with the optical sensing units.

9. The optical sensing module of claim 1, wherein the at least one optical fiber comprises a plurality of optical fibers, and wherein the optical fibers do not have a same diameter or a same refractive index.

10. The optical sensing module of claim 1, wherein a diameter of the at least one optical fiber is less than 1 mm.

11. The optical sensing module of claim 1, wherein the at least one optical fiber comprises an optical fiber without cladding.

12. The optical sensing module of claim 1, wherein the at least one fiber comprises a gradient-index optical fiber.

13. The optical sensing module of claim 1, further comprising a protection cover plate, wherein the protection cover plate comprises a plate made of a transparent material, and wherein the at least one optical fiber is disposed on a surface of the protection cover plate.

14. The optical sensing module of claim 1, further comprising a light blocking frame, wherein the light blocking frame comprises an opaque plate having an opening, and wherein the at least one optical fiber is disposed in the opening of the light blocking frame.

15. The optical sensing module of claim 14, wherein the light blocking frame is arranged to block at least one of the optical sensing units, and wherein a signal from the blocked at least one of the optical sensing units is used to calibrate an output signal of the optical sensing component.

16. The optical sensing module of claim 1, wherein the optical sensing component comprises a charge-coupled device (CCD), a complementary metal-oxide semiconductor (CMOS) device, or a photodiode array.

17. The optical sensing module of claim 1, wherein the at least one optical fiber is replaced with at least one quasi-cylindrical lens, and wherein the at least one quasi-cylindrical lens has a non-constant diameter or focal length.

18. An optical sensing module configured to receive an incident light from a planar waveguide, comprising:
    an optical sensing component comprising at least a row of optical sensing units; and
    a cylindrical lens made of a transparent material and having a cylindrical curved surface, disposed with the cylindrical curved surface facing the optical sensing units to converge at least a portion of an incident light received by the optical sensing units, wherein:
    the cylindrical curved surface surrounds a longitudinal axis of the cylindrical lens;
    the incident light enters the cylindrical lens at a first location on the cylindrical curved surface and exits the cylindrical lens at a second location on the cylindrical curved surface, subsequently received by the optical sensing units; and
    the second location is opposite the first location.

19. The optical sensing module of claim 18, wherein the transparent material comprises glass or quartz.

20. The optical sensing module of claim 18, wherein the cylindrical lens comprises an optical fiber, and wherein the optical fiber is made by melt-pulling and is bendable.

21. The optical sensing module of claim 18, wherein the optical sensing component is disposed within 5 mm from an output port of the planar waveguide.

22. The optical sensing module of claim 18, wherein the cylindrical lens comprises:
    a first part having a first diameter and corresponding to a section of the optical sensing units; and
    a second part having a second diameter and corresponding to another section of the optical sensing units.

23. The optical sensing module of claim 18, wherein the cylindrical lens comprises a plurality of parts, and wherein a diameter of each of the parts corresponds to a respective section of the optical sensing units.

24. The optical sensing module of claim 18, wherein the cylindrical lens is replaced with a quasi-cylindrical lens, and wherein the quasi-cylindrical lens has a non-constant diameter or focal length.

25. An optical mechanism of a spectrometer, comprising:
    a dispersing element;
    a planar waveguide having an output port; and
    a cylindrical lens made of a transparent material and having a cylindrical curved surface, disposed with the cylindrical curved surface facing the output port to converge at least a portion of an outgoing light from the output port, wherein:

the cylindrical curved surface surrounds a longitudinal axis of the cylindrical lens;

the outgoing light converged by the cylindrical lens has been dispersed by the dispersing element;

the outgoing light enters the cylindrical lens at a first location on the cylindrical curved surface and exits the cylindrical lens at a second location on the cylindrical curved surface; and the second location is opposite the first location.

26. The optical mechanism of a spectrometer of claim 25, wherein the cylindrical lens comprises an optical fiber.

27. The optical mechanism of a spectrometer of claim 25, wherein the cylindrical lens is disposed at the output port of the planar waveguide.

28. The optical mechanism of a spectrometer of claim 25, further comprising a second-order optical filter disposed at the output port, wherein the cylindrical lens is fixedly disposed at a surface of the second-order optical filter.

29. The optical mechanism of a spectrometer of claim 25, wherein the planar waveguide comprises two reflective planes that are substantially parallel with one another.

30. The optical mechanism of a spectrometer of claim 25, wherein the cylindrical lens is replaced with a quasi-cylindrical lens, and wherein the quasi-cylindrical lens has a non-constant diameter or focal length.

31. A spectrometer, comprising:

a dispersing element;

a planar waveguide comprising an output port;

an optical sensing component comprising at least a row of optical sensing units; and a cylindrical lens made of a transparent material and having a cylindrical curved surface, located between the output port and the optical sensing units, and disposed with the cylindrical curved surface facing the output port to converge at least a portion of an incident light received by the optical sensing units, wherein:

the cylindrical curved surface surrounds a longitudinal axis of the cylindrical lens;

the incident light converged by the cylindrical lens has been dispersed by the dispersing element;

the incident light enters the cylindrical lens at a first location on the cylindrical curved surface and exits the cylindrical lens at a second location on the cylindrical curved surface, subsequently received by the optical sensing units; and the second location is opposite the first location.

32. The spectrometer of claim 31, wherein the dispersing element comprises a concave grating.

33. The spectrometer of claim 31, wherein the cylindrical lens comprises an optical fiber.

34. The spectrometer of claim 31, wherein the cylindrical lens is replaced with a quasi-cylindrical lens, and wherein the quasi-cylindrical lens has a non-constant diameter or focal length.

* * * * *